INVENTOR:
JOHN E. BRENDON
BY: Oswald [signature]
HIS ATTORNEY

3,259,141
METHOD AND DEVICE FOR MONITORING AND SIMULATING OPERATION OF BLENDING APPARATUS

John E. Brendon, Vancouver, British Columbia, Canada, assignor to Shell Oil Company, New York, N.Y., a corporation of Delaware
Filed July 6, 1962, Ser. No. 208,046
13 Claims. (Cl. 137—3)

The invention relates to monitoring the actual operation of blending apparatus and testing such apparatus by simulating the operation thereof without the flow of streams therethrough; it includes both a device and a method. More particularly, the invention relates to monitoring and/or testing blending apparatus of the type having a first conduit through which a principal stream, e.g., liquid, flows—continuously or intermittently and at a constant or variable rate—and a second conduit which merges with said first conduit and through which an additive stream is injected intermittently in equal increments or doses, each injection being commenced when a predetermined amount of said principal stream has flowed through the first conduit, said predetermined amount being determined by metering the principal-stream flow, emitting a signal each time a predetermined quantity is metered, and initiating an injection of additive following each sequence of a predetermined number of signals. Such blending apparatus are hereinafter, for brevity, called "blending apparatus of the type described."

Blending apparatus of the type described find varied application, e.g., in the chemical and petroleum industries whenever it is desired to blend streams in a predetermined ratio, which is usually adjustable, and either one of the streams or both may be liquid or gaseous. A specific example is the injection of small amounts of liquid additive to gasoline, e.g., a tricresyl phosphate solution or de-icing fluid.

There is frequent need to monitor the operation of such blending apparatus to determine whether the control elements thereof in fact operate to blend the streams in the desired ratio. Further, it is highly desirable to put the blending apparatus through a "dry run," i.e., to simulate operation of its control elements without actual flow of fluids for determining whether it will, in an actual operation, blend the streams in the desired ratio. These desiderata obtain in all blending apparatus of the type described but assume especial importance when such apparatus can be adjusted to vary the stream ratio, e.g., by altering the predetermined number of emitted signals of the sequence which initiates the injection of additive, or by altering the quantity of additive in one dose (as by altering the duration and/or rate of flow of the additive stream) or, as in the specific example to be described, by altering both the length of said sequence and the dose size. Such adjustments usually involve the setting of indicia in relation to graduated scales and very frequently fail to effect the desired settings, due to any or a combination of such causes as inaccuracy in the scale, wear or drift in the counting or control instrument, malfunctioning of such instrument, human error in making the setting, and lack of adjustment by inadvertent displacement.

An overall check on the blending ratio can, of course, be made by measurements of the total quantities of the streams, as by flow meters or calibrating tanks. However this does not give warning of error during or prior to blending operation; further, it does not indicate the specific component or components of the blending system which is/are at fault. For these reasons difficulty has been experienced in holding the actual blending ratio within prescribed tolerance, such as 10%, and much maintenance time and effort have been expended in isolating the cause of failure to attain a desired ratio.

It is an object of this invention to provide a method and device for monitoring the operation of blending apparatus of the type described whereby the number of signals indicative of the quantity of the whole of the intermittently injected additive stream can be measured over the same time period for comparison. (The meaning of "indicated quantity" will appear in the sequel; see under "Monitoring.")

Another object is to provide a method and device for simulating the operation of a blending apparatus of the character described without actual flow of streams therethrough, whereby the indicated size of one dose or of a series of doses of the additive and the number of signals in a test period can be determined for comparison to permit the expected blending ratio to be computed. Ancillary thereto, it is an object to permit the said count and indicated dose size to be determined, as desired, either continuously throughout a test period which includes a plurality of additive injections or for a single injection.

A further object is to provide a single monitoring and simulating device according to any of the foregoing objects which can be connected to any of a plurality of blending apparatus of the type described, whereby any of such blending apparatus can be monitored and/or tested.

Further specific objects will become apparent from the following description.

In summary, according to the invention the operation is monitored by counting the signals emitted at the flow meter for the principal stream (either before or after blending with the additive) over a suitable period (which may extend over all or a part of a complete blending operation) and measuring the indicated quantity of the cumulative dose of additive during the same time; the latter is, in the illustrative example, measured by measuring the total elapsed time of the several periods during which the controller-operator is set to move the controller to open position, the successive injections in this instance being at the same flow rate. However, the indicated quantity of the cumulative dose may be measured in other ways, e.g., by measuring the total elapsed time of the periods during which the flow of additive was interrupted and computing the flow, and/or by taking the measurement directly from the controller instead of from the controller-operator. It may be noted that any measurement derived directly from the flow controller inherently involves a measurement of the operator, and the latter expression is, therefore, used generically herein. Broadly considered, any element of the flow controller can be made the basis of measurement according to the invention, and the said measurement may involve determination of the additive flow rate when this is not uniform.

Further according to the invention, the blending operation is tested without flow by generating in a count simulator a series of test signals similar to those normally emitted by the principal-stream flow meter to simulate the operation thereof, and these test signals are applied to the blending system and to the counter in lieu of said normally emitted signals, to cause operation of the controller for the additive stream or at least of the element which positions the controller. The test then proceeds as was described in the preceding paragraph, with the difference that operation is simulated. The test may be run continuously over several cycles of operation of the additive-stream controller or stopped after a single cycle.

By thus simulating the operation of the blending apparatus it is possible to verify the correctness of the settings and functioning of the proportioning elements or make the necessary corrections prior to an actual run. This was found in practice to lead to greatly reduced maintenance costs and to be particularly valuable whenever the blending ratio is changed for a new formula.

The invention will be further described with reference to the accompanying drawings forming a part of this specification and showing one preferred embodiment and a modification by way of illustration, wherein:

FIGURE 3 is a fragmentary view of the additive flow controller, showing a modification.

Figure 1:
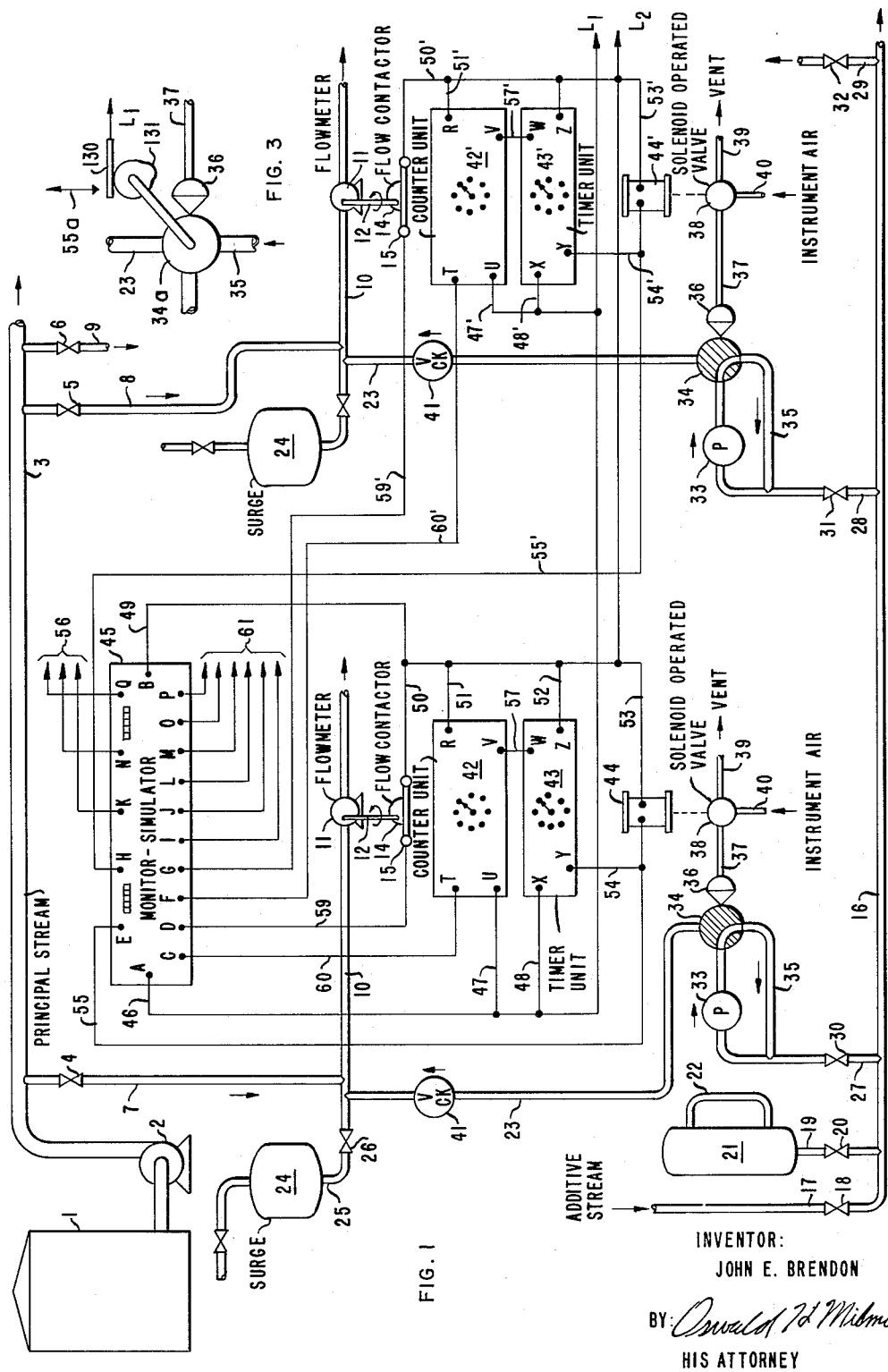
FIGURE 1 is a diagrammatic view of monitor-simulator device according to the invention serving several blending apparatus.

Referring to the drawings, FIGURE 1 shows a tank 1 from which a principal stream, e.g., gasoline, is flowed by a pump 2 to a manifold 3 for distribution to one or more blending apparatus via shut-off valves 4–6 and branches 7–9. Only two blending apparatus are shown, that supplied by pipe 7 being called the first and that supplied by pipe 8 the second. Each has a first conduit 10, provided with a flow meter 11, which is preferably of the positive displacement type to attain accuracy and which has an output shaft 12. The shaft is driven directly or through gears to make one revolution for each predetermined volume, e.g., five gallons, of the principal stream, and is coupled to the cam 13 (FIGURE 2) of a flow contactor 14 to close switch 15 once each revolution; e.g., the cam may hold the contacts closed through 120°.

An additive, e.g., de-icing or tricresyl phosphate fluid, is supplied to a manifold 16 either from storage via a pipe 17 and valve 18 or, via a pipe 19 and valve 20, from a calibration tank 21 having a gauge glass 22. The additive stream is supplied to each principal stream by a second conduit 23, which merges with the first conduit 10, either upstream of the flow meter 11, as shown, or downstream thereof. A surge tank 24 may optionally be connected via a pipe 25 and valve 26. The additive stream is supplied to the several second pipes from the manifold 16 via branch pipes 27–29 and shut-off valves 30–32. Thus any one or more blending apparatus may be placed into or taken out of operation by opening or closing the respective pair of valves 4 and 30, 5 and 31 or 6 and 32. The additive stream is made to flow through the operative second conduits at a predetermined constant rate by its respective pump 33, which is of the positive displacement type, e.g., adjustable-stroke reciprocating pumps driven at constant speed. Flow from each of the pumps is controlled by a flow controller, such as a three-way valve 34 which directs the pump output either totally into the conduit 23 or totally into a return pipe 35 leading to the pump suction. Each valve 34 has a valve operator which includes a spring-loaded pneumatic motor 36. Each operator normally moves its controller to divert the pump output into the return pipe 35 and moves the valve to its other position when air under pressure is supplied via a duct 37; these positions are herein called, respectively, the closed and open positions of the controller. The air pressure in each duct 37 is determined by a solenoid-operated, three-way valve 38 which connects the duct 37 either to a vent 39 to close the controller or to a pipe 40 by which instrument air under pressure is supplied, for opening the controller. Parts 36–39 and 44 (to be described) collectively constitute the valve operator, which is a part of the controller. Each second conduit is preferably provided with a check valve 41 to prevent entry of the principal stream into the conduit system of the additive.

Each blending apparatus includes, further, a counter unit 42 or 42', a timer unit 43 or 43', and a solenoid 44 or 44' for operating the respective valve 38. (Where useful to avoid ambiguity, elements for the second blending apparatus are denoted by primed reference numbers.)

Figure 2:
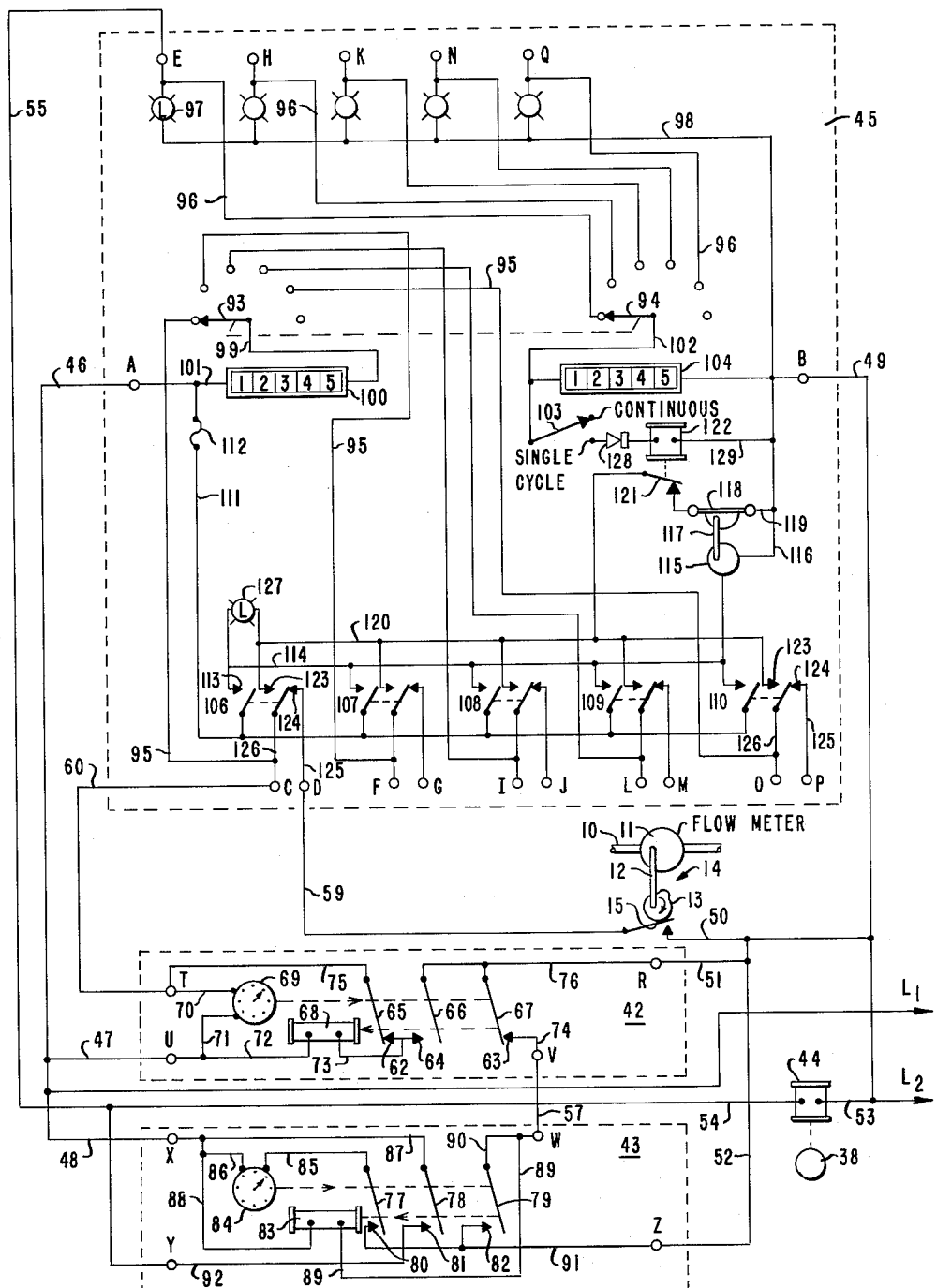
FIGURE 2 is a schematic of the monitor-simulator, the counter unit and the timer unit of FIGURE 1.

Each counter unit has four electrical terminals R, T, U, V, and each timer unit four terminals W, X, Y, Z, internally wired as will be described below in connection with FIGURE 2. The several blending apparatus have a common monitor-simulator 45 which, in the embodiment shown, can be used with any of five blending apparatus and has seventeen electrical terminals A–Q, also to be described hereinafter.

Direct or alternating electrical energy is supplied from a suitable source to conductors $L_1$ and $L_2$, A.C. current being assumed in the following description. The conductor $L_1$ is connected via a circuit 46 to the monitor-simulator terminal A, via circuit 47 or 47' to each counter unit terminal U, and via circuit 48 or 48' to each timer unit terminal X. The conductor $L_2$ is connected via a circuit 49 to the monitor-simulator terminal B, via 50 or 50' to one side of each flow contactor 14, via 51 or 51' to each counter unit terminal R, via 52 or 52' to each timer unit terminal Z, and via 53 or 53' to one terminal of each solenoid 44 or 44'. The other terminal of each solenoid is connected via a circuit 54 or 54' to a terminal Y of the respective timer unit and, additionally, via a branch circuit 55 or 55' to a corresponding terminal E or H of the monitor-simulating device. The solenoids 44 and 44' are arranged to move their respective controllers 34 to open position when electrically energized and permit movement to closed position when deenergized. The three circuits 56 from terminals K, N and Q, bracketed in FIGURE 1, are similarly connected as branch circuits to additional solenoids of three additional blending apparatus, not shown. Terminal V of each counter unit is connected via a circuit 57 or 57' to terminal W the timer unit of the same blending apparatus.

The normally de-energized contact of each flow contactor 14 is connected via a circuit 59 or 59' to a corresponding terminal D or G of the monitor-simulator device. Each counter unit is further connected at terminal T via a circuit 60 or 60' to a corresponding terminal C or F of the monitor-simulator device. It will be noted that there is one terminal at the top and, in opposite relation, two terminals at the bottom of this device for each blending apparatus. The three pairs of circuits 61 from the last six terminals I–J, L–M and O–P, bracketed in FIGURE 1, are similarly connected to three additional blending apparatus, not shown. Thus, each group of three consecutively lettered terminals C–D–E, F–G–H, etc., is tied to a separate blending apparatus.

Although the drawing, for simplicity, shows only two manifolds 3 and 16 supplying all blending apparatus, it is evident that additional manifolds may be provided to supply different principal and/or additive streams to different blending apparatus without departing from the scope of the invention.

The details of the units 42, 43 and 45 will be described with reference to FIGURE 2, wherein the external circuits for only one blending apparatus are shown. It will be understood that all counter units are alike and that all timer units are alike.

The counter unit 42 includes a three-pole ganged switch having two normally closed contacts 62 and 63 and one normally open contact 64. The three armatures 65–67, shown in their normal position, are operated by a counter clutch coil 68 when the latter is electrically energized and are mechanically restored to normal by a counter mechanism 69 when the latter has completed a counting operation. The forces applied by the coil and mechanism are indicated by the arrows on the dashed lines. The mechanism 67–69 is known per se and is not, therefore, described in detail; one suitable construction is the Microflex Reset Counter described in bulletin 720, May 1950, of the Eagle Signal Corp., Moline, Illinois. In brief, the counter 69 includes one or two pointers which can be set to any integral number on a dial scale and fixed in that position, and has a pair of electrical terminals. Each time an electrical pulse is applied to said terminals a threaded shaft is rotated a constant amount, causing a dog, which is threadedly engaged thereto, to advance a unit distance. When a number of pulses equal to the number on the scale indicated by the pointer have been received the dog is reset and, upon completion of the restoring motion, restores the armatures to the normal positions shown. In the drawing the terminals of the counter are shown to be connected by circuits 70 and 71 respectively to the terminals T and U. The latter terminal is further connected by a circuit 72 to one side of the clutch coil 68, the other side of which is connected by a circuit 73 to the contacts 62 and 64. The contact 63 is connected by a circuit 74 to the terminal V. Armature 65 is connected by a circuit 75 to the terminal T, and armatures 66 and 67 are both connected by a circuit 76 to the terminal R.

The timer unit 43 includes a three-pole ganged switch comprising armatures 77–79 and normally open contacts 80–82. These armatures are drawn from their normal positions, shown, by a timer clutch coil 83 when the latter is electrically energized and mechanically restored by a timer 84 when the latter has completed a movement of predetermined duration. The forces applied are indicated by the arrows on the dashed lines. The timer unit is known per se and is not, therefore, described in detail; one suitable timer is the Microflex Reset Timer described in bulletin 110, August 1950, of the Eagle Signal Corp. It includes, in the timer 84, one or two pointers which can be set to indicate any number of seconds on a dial scale and fixed in that position and has an electric clock motor which drives a tripping element. When the motor has run for the time period indicated by the pointer the tripping element releases a spring-loaded actuator which restores the timer and armatures. Further, the timer clutch coil 83 must be de-energized to reset an escapement mechanism in the timer 84 before an electrical impulse can initiate another cycle. The terminals of the timer motor are connected via circuits 85 and 86 respectively to the armature 77 and the terminal X, which is additionally connected to the armature 78 via a circuit 87 and to one terminal of the timer clutch coil 83 via a circuit 88; the other terminal of the coil is connected via a circuit 89 to the terminal W, which is also connected via a circuit 90 to the armature 79. Contacts 80 and 82 are connected via a circuit 91 to the terminal Z and contact 81 via a circuit 92 to the terminal Y.

The monitor-simulator device 45 includes two ganged rotary switches 93, 94, which can be set manually to any of six positions, of which the first five correspond to the five blending apparatus and the sixth (proceeding clockwise) is an "Off" position. The first five contacts of switch 93 are separately connected to terminals C, F, I, L and O, respectively via independent circuits 95, and the corresponding contacts of switch 95 to terminals E, H, K, N and Q, respectively, via independent circuits 96. Each of the latter terminals is further connected to one side of a corresponding pilot lamp 97; the other sides of these lamps are connected to $L_2$ via common circuit 98 and terminal B. The contactor of switch 93 is connected via a circuit 99 to one side of a resettable digital accumulator 100, the other side of which is connected to $L_1$ via a circuit 101 and terminal A. The accumulator contains a solenoid-activated ratchet mechanism and decimal carry elements for counting the number of electrical pulses applied. The contactor of switch 94 is connected by a circuit 102 to the armature of a manually settable, two-position cycle switch 103 and to one side of a resettable, electrical elapsed-time meter 104, the other side of which is connected to terminal B via a circuit 105. The meter contains an electric clock motor and decimal carry elements to indicate the time, e.g., in seconds, that power is applied.

The device includes, further, five manually and individually settable, two-pole, two position function switches 106–110, one for each associated blending apparatus. The left pole of each said switch is connected via a common circuit 111 and a fuse 112 to the terminal A. These poles cooperate with normally open contacts 113, which are connected via a common circuit 114 to one side of an electric motor 115, the other side of which is connected via a circuit 116 to the terminal B. The motor drives a shaft 117 carrying a cam (not shown, but constructed like the cam 13) of a simulator count switch 118, the parts 115, 117 and 118 together constituting a count simulator. One contact of the switch 118 is connected to the terminal B via a circuit 119 and the other side to a circuit 120 via a normally closed relay switch 121 having a coil 122. The circuit 120 is connected to the several normally open contacts 123 which cooperate with the right poles of the function switches, these poles having normally closed contacts 124 which are separately connected via circuits 125 to the terminal D, G, J, M and P, respectively. The said right poles are connected separately via circuits 126 to the terminals C, F, I, L and O, respectively. These switches are shown in their right or "Normal" positions, for monitoring; they are set to their left or "Test" positions to simulate blending. A "test" lamp 127 is connected between the circuits 114 and 120 to indicate that any function switch is in test position.

The cycle switch 103 has an open position, marked "Continuous," and a "Single Cycle" position in which it connects the circuit 102 to the relay coil 122, optionally through a rectifier 128. Coil 122 is further connected via a circuit 129 to terminal B. When the coil 122 is energized the relay 121 is opened.

It will be understood that each blending apparatus may be provided with electrical switches for disconnecting $L_1$ and $L_2$ when out of service. For simplicity, these are not shown.

Operation

The function switches 106–110 are in their normal (right) positions, as shown, for blending operation of their associated blending apparatus, i.e., circuits 59 and 60 are interconnected by contact 124, as are circuits 59′ and 60′, etc. The desired count and injection time are set by moving the pointers on the counters 69 and timers 84; the pointers remain set during a run. The appropriate valves, e.g., 4 and 30, are opened and power from $L_1$ and $L_2$ is applied to the selected blending apparatus. The line potential is constantly present across terminals U and R of the counter unit and X and Z of the timer unit. Further, terminal W of the latter is initially connected to $L_2$ via circuits 57 and 74, contact 63 and circuits 76 and 51. The timer clutch coil 83 is thereby energized via circuit 89, operating armatures 77–79 and thereby maintaining the coil energized via circuit 91, contact 82 and circuits 90 and 89. This also energizes the timer 84 via contact 80 and circuit 85, and connects the terminal Y to $L_1$ via contact 81 and circuit 87, to energize the solenoid 44, which thereupon operates valve 38 to admit instrument air from the duct 40 to duct 37 and operator 36 and thereby move control valve 34 to open position; this initiates an injection cycle. The total additive stream effluent from pump 33 then flows via the second conduit 23 into the first conduit 10 and is combined with the principal stream flowing through the latter from the pipe 7.

When the timer has run for the time indicated by its preset pointer it resets itself and mechanically restores the armatures 77–79; this de-energizes the parts 83, 84 and 44, permitting the valve 38 to return to normal, venting the air from the valve operator 36 and causing the control valve 34 to move to closed position. The total effluent from the pump 33 is then diverted to the return pipe 35 to end the injection cycle. Because, as will become apparent, the contact 63 is open at this time, circuit 89 is not energized to start immediately another injection cycle. It will be noted that an additive dose of predetermined size is thus injected into the conduit 10 during each injection cycle, and that said size is determined by the pumping rate and the injection time set on the timer 84. The former is usually adjusted only infrequently and the size of the dose for any particular blending operation is normally varied by setting the timer.

The above injection cycle is repeated each time the terminal W is energized via contact 63. Operation of the latter is as follows: The flow contactor 14, driven by the flow meter 11, closes and gives one electrical pulse signal or count for each predetermined volume of product flowing through the meter, e.g., one count for each five gallons. These signals are applied to the counter 69 via circuits 59, 60 and 70, to advance the counter one step for each signal. The first signal is also transmitted via circuit 75 and contact 62 to the circuit 73 and counter clutch coil 68, which attracts the armatures 65–67 and holds itself energized via contact 64, armature 66 and circuit 76. Contacts 62 and 63 are thereby opened. When the number of signals set on the counter 69 have been received from the circuit 60 the counter resets itself to zero in time to be re-energized by the next signal; it thereby mechanically restores the armatures 65–67 to the positions shown, in readiness to repeat a count cycle. Restoration of the armatures closes the contact 63, thereby initiating an injection cycle. The contact 63 is reopened by the next signal from the flow contactor 14 prior to completion of the injection cycle.

The blending ratio can be adjusted by changing either or both the count on the counter 69 and the time on the timer 84 (apart from the gear ratio between the meter 11 and contactor 14 and the pumping rate of the pump 33, which are not usually altered). As was previously noted, there is always present a risk that the counter unit and timer unit will, for any of the stated causes, not lead to the desired blending ratio, and the device 45 permits both monitoring and simulation of the operation of any selected unit. These functions will be described separately.

If, for any reason, the counter unit comes to rest in the position shown while power is applied to the lines $L_1$ and $L_2$, thereby continuously energizing the clutch coil 83 via circuits 76, 57 and 89, the timer unit will not repetitively initiate injection cycles because, as was noted above, this can occur only after the clutch coil has been de-energized to permit the escapement to be reset.

Monitoring

The blending apparatus to be monitored is selected by setting the switch 93–94 to the selected apparatus. The corresponding function switch (106–110) is set to its "Normal" position shown. The accumulator 100 and meter 104 may be reset initially to zero, if desired. The blending operation proceeds as described above. The number of signals from the flow contactor 14 is then counted by the accumulator, which receives the electrical pulses via the selected circuit 95, the switch 93 and the circuit 99. Each time the contact 81 is closed to energize the terminal Y and solenoid 44 the elapsed time meter 104 is energized via the selected circuits 55 and 96, the switch 94 and circuit 102. The meter, therefore, registers the total time that the solenoid 44 is energized throughout a series of injection cycles, being de-energized simultaneously with the solenoid. The corresponding lamp 97 is illuminated during each injection period, affording the operator a visual indication of the injection. At the end of a blending operation the total flow can be determined from the reading on the accumulator 100 and the indicated quantity of the additive from the reading on the meter 104. The indicated quantity in this embodiment is the same as the actual quantity whenever the delivery rate of the pump is that expected and the other elements of the controller, viz., parts 34–39 function correctly. The indicated quantity will differ from the actual quantity when any of these conditions fail. Hence, when a check run made with the calibration tank 21 shows a discrepancy between these quantities it shows the cause to be in failure of the pump 33 to deliver at the desired rate or some malfunction in the controller 34 or its operating means. Similarly, the counter 100 serves as a check on the total flow delivered.

Simulating

The blending apparatus to be simulated is selected as for monitoring, but the corresponding function switch (106–110) is set to "Test," i.e., to the left. Suitable valves, e.g., 4 and 30, are shut to prevent flow through the selected blending apparatus. The desired count and injection period having been set on the counter 69 and timer 84, the accumulator 100 and meter 104 having been set to zero, and the cycle switch 103 set to the "Continuous" position shown, power is applied to $L_1$ and $L_2$. This energizes the motor 115 via circuits 116, 114, contact 113 and circuit 111 to drive the contactor 118. A series of electrical pulses, called simulated count or test signals, is thereby applied to the circuit 120 and, via a contact 123, both to the circuit 60 and terminal T of the counter unit (in lieu of the actual signal from the flow contactor 14, which is now idle) and to the circuit 95 of the selected blending apparatus, the switch 93 and the accumulator 100. The test signals applied at T cause operation of the units 42 and 43, together with energization of the solenoid 44 and operation of the valves 38 and 34 as previously described; this also causes the elapsed time meter 104 to indicate the total time over a sequence of simulated injection cycle that the solenoid 44 was energized. At the end of the test the readings on the accumulator 100 and meter 104 are compared as described for monitoring and the corrections can be made in the units 42 and 43 if an error is indicated. During the test the lamp 127 is energized once for each signal, to warn the operator that a test condition prevails.

For single cycle simulation the operations described in the preceding paragraph are performed with the switch 103 in the "Single Cycle" position. While the counter 69 is stepping and the solenoid 44 is not energized, the accumulator 100 adds the number of test signals prior to the injection. Upon energization of the solenoid 44 the circuits 55 and 102 are also energized, causing the flow of current through the relay coil 122. The switch 121 is thereupon opened to stop the further transmission of test signals to the circuit 120 without, however, preventing completion of the initiated injection cycle and operation of the meter 104. This suspends accumulation of signals in the accumulator 100 and affords time to read the total. When the injection cycle is completed the coil 122 is de-energized, the relay switch 121 closes, and counting is resumed. Hence the effect of operating with the switch 103 at "Single Cycle" is to create pauses in the counting during each injection cycle or, in other words, to stop the generation of test signals in certain positions of the flow controller for the additive stream.

In actual plant use it was found that use of the monitor-simulator device not only reduced maintenance time by permitting facile adjustment and isolating the cause of incorrect blending ratios but resulted in greatly improved accuracy. Thus, whereas a tolerance of 10% in the quantity of the additive stream could be met only with difficulty without this device, it is now possible to operate with errors smaller than 1%.

It is evident that numerous modifications in the system may be made without departing from the scope of the invention. In particular, the monitor-simulator can be made to check not only the energization of the solenoid 44 but additional elements of the additive flow controller, by connecting the circuit 55 to a switch controlled by an element which is actuated by the said solenoid, such as the valve 38 or 34. The latter is shown in FIGURE 3, wherein the valve 34a, which replaces valve 34, controls a normally open switch 130 by a cam 131 so as to close the switch when the controller is in open position. The switch 130 is connected between $L_1$ and a circuit 55a which replaces the circuit 55 and extends to the terminal E. The meter 104 in this case registers the total time that the controller was open, thereby affording a check on the overall operation of all controller elements.

I claim as my invention:

1. In a blending system, the combination comprising: a first conduit having a flow meter including a signal emitter which emits a series of pulse signals, the number of said signals being directly proportional to the volume of a variable flow of a principal stream therethrough with each signal corresponding to a predetermined fixed quantity of said principal stream;

a second conduit for an additive stream merging with said first conduit, said second conduit having flow control means including a flow controller which is movable between open and closed positions to permit intermittent flow of said additive stream into said principal stream and an operator for moving said flow controller between said open and closed positions, said flow control means further including means responsive to a predetermined number of said signals for causing said operator to move said controller to an open position for a predetermined time and thereafter move said controller to a closed position for each sequence of said predetermined number of signals; and a monitoring device including an accumulator operatively connected to said flow meter for counting the number of said signals to measure the indicated quantity of flow of said principal stream, and a cumulating meter connected to said flow control means to measure the indicated quantity of said additive stream.

2. The combination according to claim 1 wherein said cumulating meter is an elapsed time meter which is arranged to measure the time during which the said operator is set to hold the controller in one of said positions.

3. The combination defined in claim 1 wherein said monitoring device includes, additionally, a count simulator for generating a series of test signals, and circuit means connected to said accumulator for substituting the said test signals for the said signals emitted from the signal emitter of the flow meter, whereby the operation of the blending apparatus can be simulated and tested without flow of said streams.

4. The combination defined in claim 1 wherein said monitoring device includes, additionally, a count simulator independent of said signal emitter for generating a series of test signals, means for driving said count simulator continuously throughout a series of periods during which the operator is set to hold the controller in open and closed positions, and circuit means connected to said accumulator for substituting the said test signals for said signals emitted from the signal emitter of the flow meter, whereby the operation of the blending apparatus can be simulated and tested over a series of cycles of operation of the controller operator without flow of said streams.

5. The combination of: blending apparatus which comprises a first conduit having a flow meter including a signal emitter which emits a series of signals in linear correspondence to the flow of a principal stream therethrough and a second conduit for an additive stream merging with said first conduit, said second conduit having flow control means including a flow controller which is movable between open and closed positions to permit intermittent flow of said additive stream and further including an operator responsive to said signals for moving the controller to each of said positions; and a monitoring device which comprises an accumulator for counting said signals by addition operatively connected to said flow meter to measure the indicated quantity of flow of said principal stream, a cumulating meter connected to said flow control means to measure the indicated quantity of the additive stream, a count simulator independent of said signal emitter for generating a series of test signals, means for driving said count simulator during the period that the operator is set to hold the controller in one of said positions, circuit means connected to said accumulator for substituting the said test signals for said signals emitted from the signal emitter of the flow meter, and means responsive to the operation of said flow control means for stopping the transmission of signals from said count simulator after completion of an operation of the controller, whereby the operation of the blending apparatus can be simulated and tested during a signal operation of the controller without flow of said stream.

6. The combination of: blending apparatus which comprises a first conduit having a flow meter for a principal stream and a second conduit for an additive stream merging with said first conduit, said second conduit having flow control means including a flow controller which is movable between open and closed positions to permit intermittent flow of said additive stream, said meter including an output circuit, a pair of electrical contacts for connecting a source of electrical potential to said output circuit and means for closing said contacts once after each passage of a fixed quantity of said principal stream through the meter, said controller including means normally moving it to closed position, electrically actuated operating means for moving the controller to open position, a counter connected to said output circuit and to said operating means for energizing said operating means following each sequence of a predetermined number of electrical pulses from said output circuit and a timer for de-energizing said operating means after a predetermined time; and a monitoring and simulating device comprising an electrically actuated digital accumulator for counting electrical pulses, said accumulator having digital indicia for indicating the total counter, a count simulator including a pulse output circuit for generating a series of electrical test pulses, switch means for selectively connecting said accumulator to said output circuit or to said count simulator, and an electrically driven elapsed-time meter connected to said operating means for energizing the said meter during the periods in which the operating means is energized.

7. The combination defined in claim 6 wherein said monitoring device includes, additionally, means connected to said operating means for stopping the transmission of electrical pulses from said count simulator upon energization of said operating means.

8. The method of monitoring the operation of blending apparatus wherein a principal stream is metered, a series of signals is emitted at a rate proportional to variations in the metered flow of said stream whereby the number of said signals varies in response to variations in the volume of flow of said stream, and an intermittent additive stream is injected into said principal stream by flowing, under control of flow control means, a predetermined amount of the additive stream following each sequence of a predetermined number of said signals, said flow control means being actuated responsively to said signals, said monitoring method comprising the steps of: counting the said signals over a period which includes at least one complete injection of said additive stream; measuring the period of operation of at least an element of said flow control means to obtain an indication of the amount of additive injected during said period; and comparing the resulting count and indication.

9. The method of monitoring the operation of blending apparatus wherein a principal stream is metered, a series of electrical pulses is emitted with each pulse representing a fixed quantity of said stream and the number of said pulses varying in response to variations in the volume of flow of said stream, and an additive stream having a constant flow rate is injected into said principal stream intermittently for fixed time periods under control of flow control means including an operator and a flow controller which is moved alternately to open and closed positions by said operator responsively to said pulses following each sequence of a predetermined number of said pulses, said monitoring method comprising the steps of: counting the said pulses throughout an extended period which includes several injections of said additive stream; measuring the cumulative time during said extended period that said operator of said flow control means is set to move said controller to open position as an indication of the amount of additive injected into said principal stream during said extended period; and comparing the resulting count and cumulative time.

10. The method of testing the operation of blending apparatus without flow of streams therethrough, said apparatus being of the type wherein a principal stream is metered, a series of signals is normally emitted at a rate proportional to variations in the measured flow of said stream whereby the number of said signals varies in response to variations in the volume of flow of said stream, and an intermittent additive stream is injected into said principal stream by flowing, under control of flow control means responsive to said signals and including a flow controller which is moved alternately to open and closed positions, a predetermined amount of the additive stream following each sequence of a predetermined number of said signals, said testing method comprising the steps of: generating a series of simulated count signals; counting the said simulated count signals during a period that includes at least one operation of the flow controller; applying said simulated count signals to said flow control means and operating at least an element of the flow control means thereby in lieu of by said normally emitted signals while preventing flow of said additive stream; and measuring the time during which said element is set to move the flow controller to one of said positions during said period.

11. The method according to claim 10 wherein, in the last-recited step, the measurement is of the time that the said element is set to move the flow controller to open position.

12. The method according to claim 10 wherein said period includes several cycles of operation of the controller.

13. The method according to claim 10 wherein said generation of said simulated count signals in interrupted while said flow control means is set to move the controller to open position.

References Cited by the Examiner
UNITED STATES PATENTS

| | | | |
|---|---|---|---|
| 2,074,883 | 3/1937 | Zieboltz et al. | 137—3 |
| 2,239,157 | 4/1941 | Lowe | 137—101.19 |
| 2,939,469 | 6/1960 | Kampf et al. | 137—3 |
| 3,034,331 | 5/1962 | Brueckner | 73—3 |
| 3,036,585 | 5/1962 | Shawhan | 137—101.19 |
| 3,073,147 | 1/1963 | Bauman | 73—3 |

ISADOR WEIL, *Primary Examiner.*

MARTIN P. SCHWADRON, *Examiner.*

R. MASSENGILL, D. LAMBERT, *Assistant Examiners.*